(12) United States Patent
Baba et al.

(10) Patent No.: US 10,862,357 B2
(45) Date of Patent: Dec. 8, 2020

(54) PERMANENT-MAGNET-EMBEDDED ELECTRIC MOTOR, BLOWER, AND REFRIGERATING AIR CONDITIONER

(71) Applicant: Mitsubishi Electric Corporation, Tokyo (JP)

(72) Inventors: Kazuhiko Baba, Tokyo (JP); Naohiro Oketani, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 15/555,995

(22) PCT Filed: Mar. 18, 2015

(86) PCT No.: PCT/JP2015/058125
§ 371 (c)(1),
(2) Date: Sep. 6, 2017

(87) PCT Pub. No.: WO2016/147358
PCT Pub. Date: Sep. 22, 2016

(65) Prior Publication Data
US 2018/0062460 A1 Mar. 1, 2018

(51) Int. Cl.
*H02K 1/27* (2006.01)
*H02K 21/16* (2006.01)
(Continued)

(52) U.S. Cl.
CPC ............... *H02K 1/274* (2013.01); *B60H 1/32* (2013.01); *H02K 1/146* (2013.01); *H02K 1/276* (2013.01);
(Continued)

(58) Field of Classification Search
CPC ........ H02K 1/274; H02K 1/146; H02K 1/276; H02K 21/16; H02K 2213/03; B60H 1/32; B60H 2001/3286
(Continued)

(56) References Cited

U.S. PATENT DOCUMENTS 4,874,975 A * 10/1989 Hertrich ................ H02K 29/06
310/186
8,026,648 B2  9/2011 Abel et al.
(Continued)

FOREIGN PATENT DOCUMENTS

CN      1890858 A    1/2007
CN    102511119 A    6/2012
(Continued)

OTHER PUBLICATIONS

Machine translation of JP-2012257433-A. (Year: 2012).*
(Continued)

*Primary Examiner* — Michael Andrews
(74) *Attorney, Agent, or Firm* — Posz Law Group, PLC

(57) ABSTRACT

A permanent-magnet-embedded electric motor includes a stator core including a yoke and a plurality of teeth, a rotor core including a plurality of magnet insertion holes, and a plurality of permanent magnets respectively inserted into the magnet insertion holes, each being arranged with a lateral direction set in a radial direction of the rotor core and with a longitudinal direction set in a direction orthogonal to the radial direction. When a width of base sections of the teeth is represented as S1, a width of a distal end sections of the teeth is represented as S2, a width of the permanent magnets in the longitudinal direction is represented as R1, and a width of the magnet insertion holes in an extension direction thereof is represented as R2, relations of $S1 \leq R1 < S2$ and $S1 \leq R2 - R1$ are satisfied.

7 Claims, 3 Drawing Sheets

(51) Int. Cl.
  *B60H 1/32* (2006.01)
  *H02K 1/14* (2006.01)
(52) U.S. Cl.
  CPC ..... *H02K 21/16* (2013.01); *B60H 2001/3286* (2013.01); *H02K 2213/03* (2013.01)
(58) Field of Classification Search
  USPC .................................................. 310/156.53
  See application file for complete search history.

(56) References Cited

U.S. PATENT DOCUMENTS

| | | | |
|---|---|---|---|
| 9,013,136 B2 | 4/2015 | Yamagiwa et al. | |
| 2005/0168089 A1 | 8/2005 | Miyashita et al. | |
| 2006/0279158 A1 | 12/2006 | Kim | |
| 2007/0217928 A1 | 9/2007 | Isobe et al. | |
| 2009/0066181 A1* | 3/2009 | Abel | H02K 1/276 310/156.53 |
| 2012/0187877 A1* | 7/2012 | Yamagiwa | B60L 15/2045 318/400.02 |
| 2013/0214635 A1* | 8/2013 | Yabe | H02K 17/20 310/197 |
| 2015/0084468 A1* | 3/2015 | Nigo | H02K 1/276 310/156.53 |

FOREIGN PATENT DOCUMENTS

| | | | |
|---|---|---|---|
| EP | 2 485 369 A1 | | 8/2012 |
| JP | 2003-037967 A | | 2/2003 |
| JP | 2004-096978 A | | 3/2004 |
| JP | 3638944 B1 | | 1/2005 |
| JP | 2006-124127 A | | 5/2006 |
| JP | 2010-114952 A | | 5/2010 |
| JP | 2012-105482 A | | 5/2012 |
| JP | 2012-257433 A | | 12/2012 |
| JP | 2012257433 A | * | 12/2012 |
| JP | 2013-247825 A | | 12/2013 |
| WO | 2013/069076 A1 | | 5/2013 |

OTHER PUBLICATIONS

Extended European Search Report dated Aug. 27, 2018 issued in corresponding EP patent application No. 15885454.7.
Office Action dated Mar. 13, 2018 issued in corresponding JP patent application No. 2017-505959 (and English machine translation thereof).
International Search Report of the International Searching Authority dated Jun. 2, 2015 for the corresponding International application No. PCT/JP2015/058125 (and English translation).
Office Action dated Nov. 2, 2018 issued in corresponding Chinese patent application No. 201580077516.9 (and English translation).
Communication pursuant to Article 94 (3) EPC dated Oct. 13, 2020 issued in corresponding EP patent application No. 15 885 454.7.

* cited by examiner

PERMANENT-MAGNET-EMBEDDED ELECTRIC MOTOR, BLOWER, AND REFRIGERATING AIR CONDITIONER

CROSS REFERENCE TO RELATED APPLICATION

This application is a U.S. national stage application of PCT/JP2015/058125 filed on Mar. 18, 2015, the contents of which are incorporated herein by reference.

FIELD

The present invention relates to a permanent-magnet-embedded electric motor that rotates a rotor using a magnetic field of permanent magnets embedded in the rotor and a magnetic field of an electric current flowing to a coil wound around a stator, a blower, and a refrigerating air conditioner.

BACKGROUND

In Patent Literature 1, a 10-pole/12-slot permanent-magnet-embedded electric motor with concentrated winding is disclosed. A stator core of the permanent-magnet-embedded electric motor includes a plurality of teeth inwardly projecting in a radial direction from a yoke, and each of the respective teeth includes a flange section extending circumferentially at a distal end section thereof. When a forward side in a rotation direction of the rotor of the flange section is referred to as a "rotational forward-side flange section", and a backward side in the rotation direction of the rotor of the flange section is referred to as a "rotational backward-side flange section", the rotational backward-side flange section is configured to include a larger non-magnetic body portion in a part of an axial direction than the rotational forward-side flange section. Such a configuration considerably reduces an iron loss in the rotational backward-side flange section where magnetic saturation is likely to occur.

CITATION LIST

Patent Literature

Patent Literature 1: Japanese Patent Application Laid-open No. 2010-114952

SUMMARY

Technical Problem

However, in the permanent-magnet-embedded electric motor described in Patent Literature 1, there is a problem that distal end sections of the permanent magnets are likely to be demagnetized due to the rotational backward-side flange section including the larger non-magnetic body portion in a part of the axial direction. Further, in the permanent-magnet-embedded electric motor described in Patent Literature 1, a used amount of permanent magnets is large, resulting in a high cost.

The present invention has been achieved in view of the above problems, and an object of the present invention is to provide a permanent-magnet-embedded electric motor in which demagnetization resistance is improved and a used amount of permanent magnets is suppressed.

Solution to Problem

To solve the problems and achieve the object, a permanent-magnet-embedded electric motor according to the present invention includes: a stator core that includes an annular yoke and a plurality of teeth arranged on an inner side of the yoke at an equal interval in a circumferential direction of the yoke and respectively inwardly projecting from the yoke in a radial direction of the yoke; an annular rotor core that is arranged on an inner side of the stator core and includes a plurality of magnet insertion holes formed at an equal interval in a circumferential direction of the annular rotor core; and a plurality of permanent magnets respectively inserted into the plurality of magnet insertion holes, the plurality of permanent magnets being arranged at positions respectively corresponding to sides of an imaginary regular polygon having a same number of corners as number of the magnet insertion holes, each of the permanent magnets with a lateral direction set in a radial direction of the rotor core and with a longitudinal direction set in a direction orthogonal to the radial direction. Each of the plurality of teeth includes a base section inwardly projecting from the yoke in the radial direction of the yoke and having a fixed width in a direction orthogonal to the radial direction of the yoke; and a distal end section provided on an inner side of the base section and having a width larger than the fixed width of the base section in the direction orthogonal to the radial direction of the yoke. Each of both end sections in the longitudinal direction of each of the plurality of permanent magnets is adjacent to a space section that forms a part of the magnet insertion hole into which the permanent magnet is inserted. when a width of the base section is represented as S1, a width of the distal end section is represented as S2, a width of the permanent magnet in the longitudinal direction is represented as R1, and a width of the magnet insertion hole along a direction in which the magnet insertion hole extends is represented as R2, relations $S1 \leq R1 < S2$ and $S1 \leq R2 - R1$ are satisfied.

Advantageous Effects of Invention

According to the present invention, an effect where demagnetization resistance is improved and a used amount of permanent magnets is suppressed is achieved.

DESCRIPTION OF EMBODIMENTS

Embodiments of a permanent-magnet-embedded electric motor, a blower, and a refrigerating air conditioner according the present invention are described in detail below with reference to the accompanying drawings. The present invention is not limited to these embodiments.

First Embodiment

Figure 1:
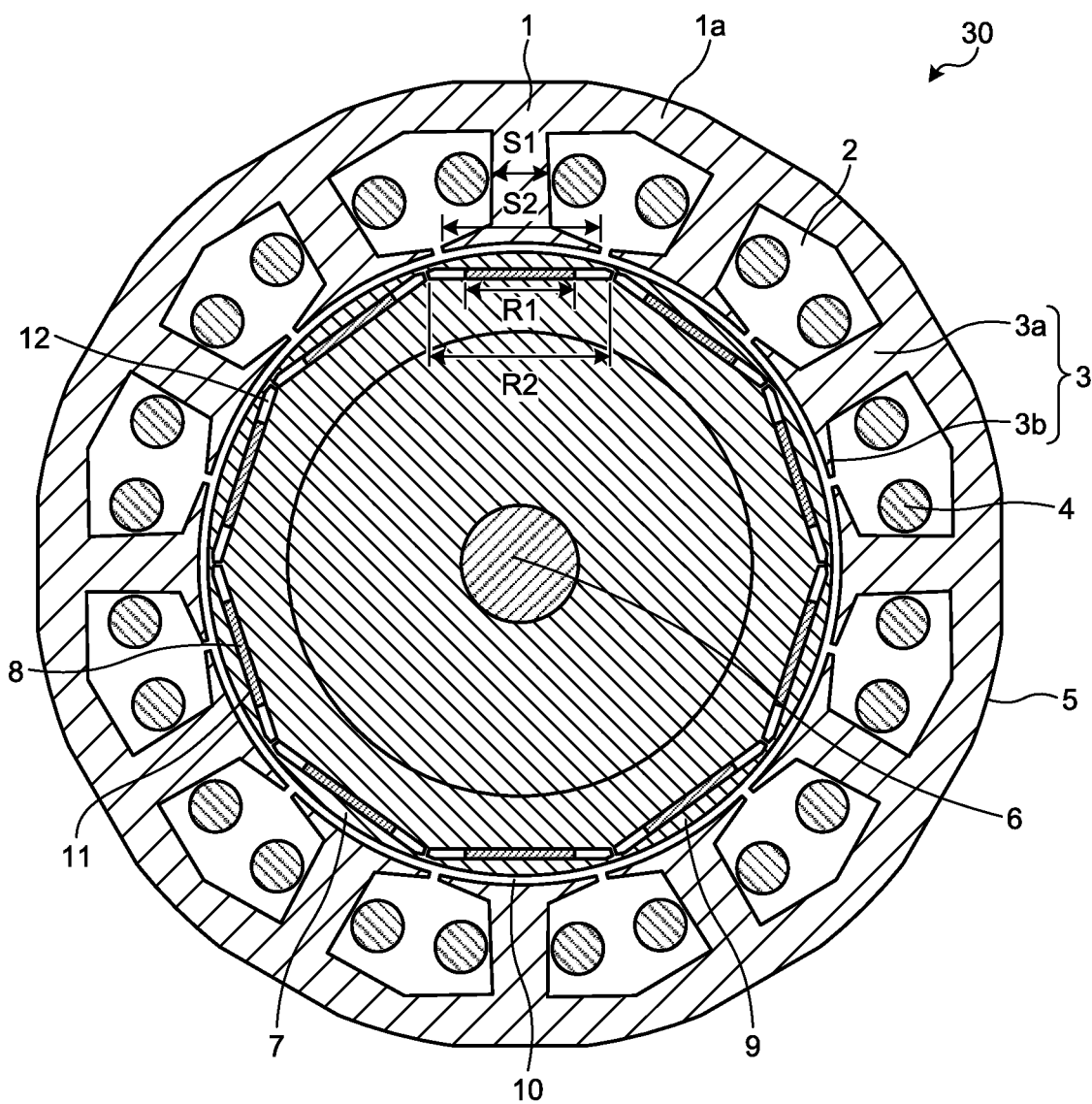
FIG. 1 is a sectional view illustrating a configuration of a permanent-magnet-embedded electric motor according to a first embodiment.
Figure 2:
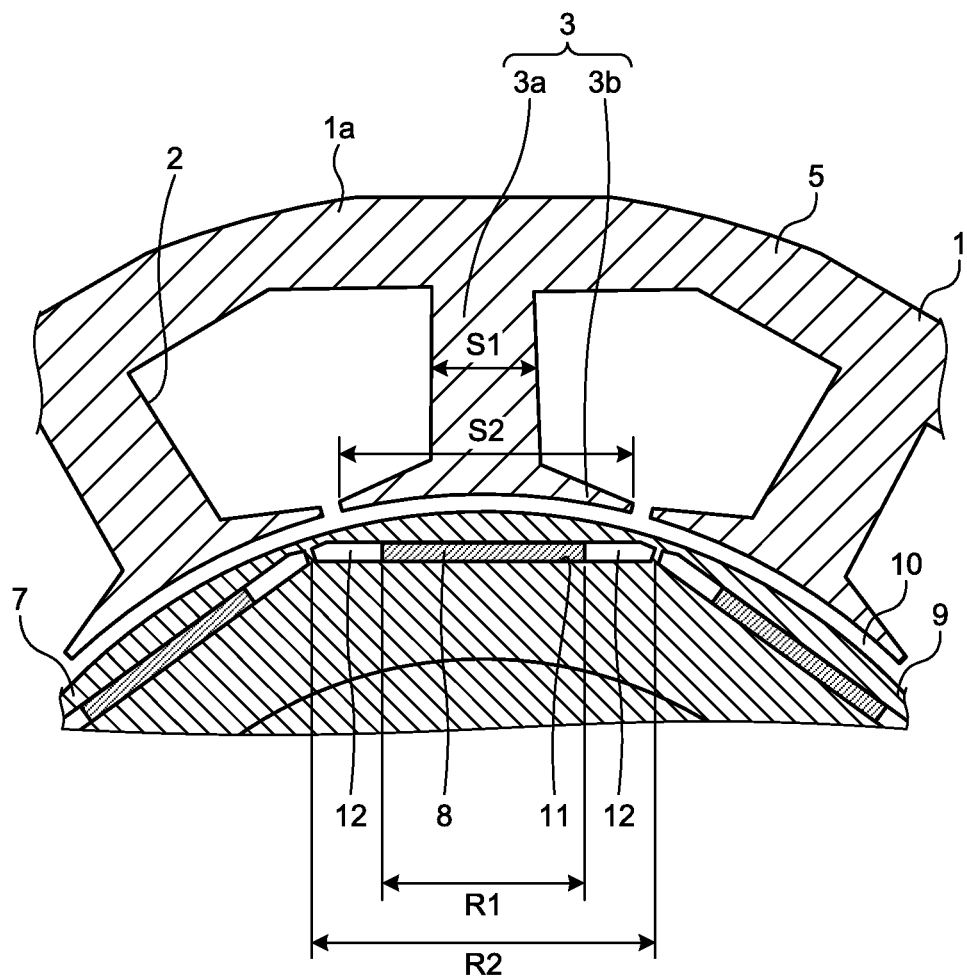
FIG. 2 is a partially enlarged view of FIG. 1 in the first embodiment.

FIG. 1 is a sectional view illustrating a configuration of a permanent-magnet-embedded electric motor according to the present embodiment. FIG. 2 is a partially enlarged view of FIG. 1. FIG. 1 illustrates a cross-section orthogonal to a rotation shaft 6 of a rotor 9.

A permanent-magnet-embedded electric motor 30 includes an annular stator 5, and a rotor 9 arranged on an inner side of the stator 5 via a clearance 10 interposed therein. The stator 5 includes an annular stator core 1 and a coil 4 wound around the stator core 1. The rotor 9 includes an annular rotor core 7 fixed to the rotation shaft 6, and ten permanent magnets 8 embedded in the rotor core 7.

The stator core 1 is configured by punching a magnetic steel sheets one by one and then stacking a plurality of punched magnetic steel sheets. The thickness of the magnetic steel sheet is typically from 0.2 to 0.5 millimeter. The stator core 1 includes an annular yoke 1a and twelve teeth 3 arranged on an inner side of the yoke 1a at an equal interval in a circumferential direction of the yoke 1a and inwardly projecting from the yoke 1a in a radial direction of the yoke 1a. A slot 2 being a space sectioned by the adjacent teeth 3 and the yoke 1a is formed between adjacent ones of the teeth 3 in the circumferential direction of the yoke 1a. The number of the slots 2 is twelve.

Each of the teeth 3 includes a base section 3a that inwardly projects from the yoke 1a in a radial direction of the yoke 1a and that has a fixed width in a direction orthogonal to the radial direction of the yoke 1a, and a distal end section 3b that is provided inside of the base section 3a and that has a larger width than the base section 3a in a direction orthogonal to the radial direction of the yoke 1a. That is, the base section 3a extends in the radial direction of the yoke 1a and the width thereof is fixed in the radial direction. Meanwhile, the distal end section 3b has a flange shape or an umbrella shape, and opposite sides of the distal end section 3b in the circumferential direction of the yoke 1a project circumferentially with respect to the base section 3a. The distal end section 3b has a symmetrical shape in the circumferential direction. In this manner, by forming the distal end section 3b in a flange shape or an umbrella shape, the magnetic force of the permanent magnets 8 embedded in the rotor 9 is effectively interlinked with the teeth 3, thereby forming a structure that can improve the torque.

The coil 4 is wound around the teeth 3. The coil 4 is obtained by winding wires in a concentrated manner. That is, the coil 4 is configured by directly winding the wires around the base section 3a of the teeth 3. Wire connection of the wires of the coil 4 is three-phase delta connection. In FIG. 1, the coil 4 is represented integrally with illustrations of the cross-section of each wire being omitted. In FIG. 2, illustrations of the coil 4 are omitted.

The rotation shaft 6 is arranged on an axis line of the stator 5. The rotor 9 is fixed to the rotation shaft 6. The clearance 10 is provided between the rotor 9 and the stator 5, so that the rotor 9 can rotate on the rotation shaft 6. The clearance 10 is typically from 0.3 to 1 millimeter.

The rotor core 7 is configured, as in the stator core 1, by punching magnetic steel sheets one by one and then stacking a plurality of the punched magnetic steel sheets. The thickness of the magnetic steel sheet is typically from 0.2 to 0.5 millimeter. The rotor core 7 is formed with ten magnet insertion holes 11 at an equal interval in the circumferential direction of the rotor core 7. Each of the ten magnet insertion holes 11 is arranged at a position corresponding to each side of a regular decagon, which is an imaginary regular polygon having the same number of corners as the number of the magnet insertion holes 11. That is, the magnet insertion hole 11 has a shape in which the lateral direction is a radial direction of the rotor core 7 and the longitudinal direction is a direction orthogonal to the radial direction of the rotor core 7. The magnet insertion holes 11 are formed on an outer periphery portion of the rotor core 7. Ten permanent magnets 8 are respectively inserted into the ten magnet insertion holes 11. Therefore, each of the ten permanent magnets 8 is arranged at a position corresponding to each side of the regular decagon, which is the imaginary regular polygon having the same number of corners as the number of the magnet insertion holes 11. The permanent magnets 8 are fixed to the rotor core 7 by being press-fitted into the magnet insertion holes 11 or by applying an adhesive thereto.

The permanent magnets 8 have a tabular shape having a fixed thickness. The cross-section of the permanent magnets 8 has a rectangular shape. The cross-section in this case is a cross-section orthogonal to the axial direction of the rotor core 7. The cross-section orthogonal to the axial direction of the rotor core 7 is a cross-section orthogonal to the axial direction of the yoke 1a, and is a cross-section orthogonal to the rotation shaft 6 of the rotor 9. The permanent magnets 8 are arranged to have a lateral direction in the radial direction of the rotor core 7, and a longitudinal direction in a direction orthogonal to the radial direction. That is, in a state in which the permanent magnets 8 are inserted into the magnet insertion holes 11, the lateral direction of the permanent magnets 8 becomes the radial direction of the rotor core 7, and the direction orthogonal to the lateral direction becomes the longitudinal direction of the permanent magnets 8. The radial direction of the rotor core 7 in this case is defined at the center of the magnetic pole of the permanent magnets 8. The magnet insertion holes 11 linearly extend in the longitudinal direction of the permanent magnets 8. The ten permanent magnets 8 are magnetized in such a manner that the north pole and the south pole alternate in the circumferential direction of the rotor core 7. The 10-pole rotor 9 is formed in this manner to form a 10-pole/12-slot electric motor. The permanent magnets 8 are rare-earth magnets or ferrite magnets. The rare-earth magnets contain, for example, neodymium, iron, or boron as a main component.

Both end sections of each of the permanent magnets 8 in the longitudinal direction of the permanent magnet 8 respectively are adjacent to a pair of space sections 12. The space sections 12 are spaces formed on opposite sides in the longitudinal direction of each of the permanent magnets 8 in a state in which the permanent magnet 8 is inserted into the corresponding magnet insertion hole 11, and form a part of the magnet insertion hole 11. That is, the pair of space sections 12 form both end sections of the corresponding magnet insertion hole 11. Further, the space sections 12 extend in the same direction as the longitudinal direction of the permanent magnet 8. The space sections 12 being flux barrier sections restrict the flux flow by an air layer, which is non-magnetic. The space sections 12 can be filled with a non-magnetic material, for example, resin. Accordingly, positioning and fixation of the permanent magnets 8 can be reliably performed.

As illustrated in FIGS. 1 and 2, the present embodiment is configured in such a manner that, when the width of the base section 3a of the teeth 3 is represented as S1, the width of the distal end section 3b of the teeth 3 is represented as S2, the width of the permanent magnets 8 in the longitudinal direction of the permanent magnets 8 is represented as R1, and the width of the magnet insertion holes 11 along the extension direction of the magnet insertion holes 11 is represented as R2, relations S1≤R1<S2 and S1≤R2−R1 are satisfied. The width of the base sections 3a of the teeth 3 is the width in a direction orthogonal to the radial direction of the yoke 1a. Similarly, the width of the distal end sections $3b$ of the teeth 3 is the width in the direction orthogonal to the radial direction of the yoke $1a$. Further, the width R2 of the magnet insertion holes 11 is the width of the magnet insertion hole 11 along the extension direction of the magnet insertion hole 11 from one of the space sections 12 to the other. The extension direction of the magnet insertion hole 11 is also a longitudinal direction of the magnet insertion hole 11. In the illustrated example, the width R2 of the magnet insertion hole 11 is the width of the magnet insertion hole 11 in the longitudinal direction of the corresponding permanent magnet 8.

As described above, in the present embodiment, the permanent-magnet-embedded electric motor 30 is configured to satisfy $S1 \leq R1 < S2$ and $S1 \leq R2-R1$, and particularly (R1-R2) being the sum of the widths of the paired space sections 12 is set to be equal to or larger than S1 being the width of the base section $3a$ of the teeth 3. Therefore, even if a demagnetizing field formed by the stator 5 is applied to the rotor 9, the paired space sections 12 suppresses application of the demagnetizing field to the end sections of the permanent magnet 8, to suppress demagnetization at the end sections of the permanent magnet 8, thereby improving the demagnetization resistance of the electric motor. That is, demagnetization is suppressed by setting the sum of the widths of the paired space sections 12, being a pair of flux barriers, to be equal to or larger than the width of the base section $3a$, which provides a rough indication of extent of the demagnetizing field.

Due to the configuration described above, the width of the space sections 12 increases as compared with conventional technologies. Accordingly, leakage flux of the permanent magnets 8 is suppressed, while the used amount of the permanent magnets 8 is suppressed. Because the used amount of the permanent magnets 8 is suppressed, when the permanent magnets 8 are rare-earth magnets, the cost is reduced, and an inexpensive permanent-magnet-embedded electric motor 30 can be provided.

Furthermore, due to the configuration described above, the magnetic flux of the permanent magnets 8 becomes more likely to concentrate on the base sections $3a$ of the teeth 3, and thus an induced voltage generated in the coil 4 approaches a fundamental wave, thereby enabling to suppress high-frequency components of the induced voltage. When the high-frequency components of the induced voltage are suppressed, magnetic excitation force decreases to suppress vibration and noise, and further to suppress the iron loss due to the high-frequency components.

In FIGS. 1 and 2, the permanent-magnet-embedded electric motor 30 is configured to satisfy a relation of $S2 \leq R2$. Due to such a configuration, application of the demagnetizing field to the end sections of the permanent magnets 8 is further suppressed, thereby enabling to further improve the demagnetization resistance.

According to the present embodiment, wire connection of the wires of the coil 4 is delta connection. Generally, when the wires of an electric motor are delta-connected, the length of the wires becomes √3 times the length in a case in which the wires are star-connected. Therefore, under a condition in which a winding space factor is the same, the wire diameter of the wires can be decreased in the delta-connected coil, thereby enabling to improve winding workability of the wires. However, the delta-connected coil is likely to be affected by a circulating current caused by the high-frequency components of the induced voltage due to a delta current pathway, thereby having a problem that a copper loss of the coil is increased. On the other hand, according to the present embodiment, due to the configuration in which the relations of $S1 \leq R1 < S2$ and $S1 \leq R2-R1$ are satisfied, the high-frequency components of the induced voltage can be suppressed. Therefore, even if the wire connection of the wires of the coil 4 is delta-connection, the winding workability of the wires can be improved, while suppressing the copper loss of the coil 4 due to the circulating current.

According to the present embodiment, the permanent-magnet-embedded electric motor 30 has 10 poles and 12 slots. Accordingly, the high-frequency components of the induced voltage are further suppressed as compared with other combinations of the number of poles and the number of slots, thereby enabling to further suppress vibration and noise. The present embodiment can be also applied to configurations other than the 10-pole/12-slot configuration. That is, the number of permanent magnets 8 and the number of magnet insertion holes 11 are not limited to ten, and it suffices that a plurality of the permanent magnets 8 and the magnet insertion holes 11 are provided. Further, the numbers of the teeth 3 and the slots 2 are not limited to twelve, and it suffices that plurality of the teeth 3 and the slots are provided.

Second Embodiment

In the first embodiment, there has been described a configuration in which each of the permanent magnets 8 and the pair of the corresponding space sections 12 are arranged on the same straight line. In a second embodiment, a configuration example in which each of the permanent magnets 8 and the corresponding pair of space sections 12 are not arranged on the same straight line is described.

Figure 3:
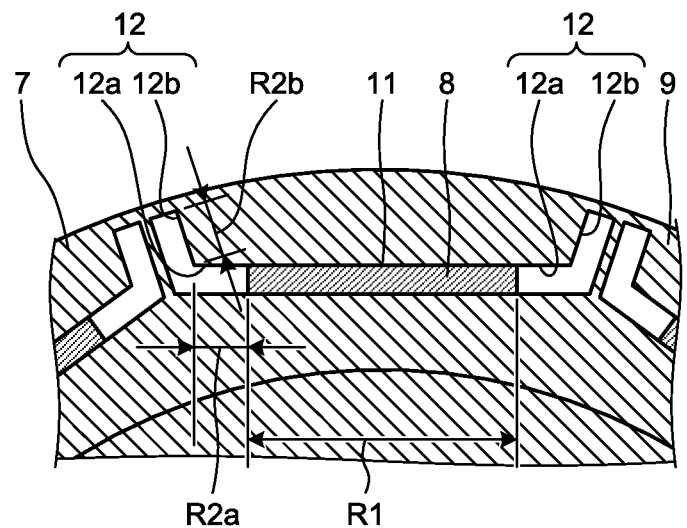
FIG. 3 is a partially enlarged view of a rotor according to a second embodiment.

FIG. 3 is a partially enlarged view of the rotor 9 according to the present embodiment. In FIG. 3, like constituent elements as those illustrated in FIGS. 1 and 2 are denoted by like reference signs. Each of the space sections 12 includes a region $12a$ and a region $12b$ communicated with the region $12a$. The region $12a$ being a first region extends in the same direction as the longitudinal direction of the corresponding permanent magnet 8. That is, the permanent magnet 8 and a pair of the regions $12a$ are arranged on the same straight line. On the other hand, the region $12b$ being a second region extends outwardly in a radial direction of the rotor core 7. That is, in the present embodiment, the permanent magnets 8 are arranged on an inner side in a radial direction of the rotor core 7 and the space sections 12 are bent outwardly between the magnetic poles, as compared with the first embodiment. Therefore, each of the magnet insertion holes 11 includes a pair of regions $12b$ that extend outwardly in the radial direction of the rotor core 7, to form an obtuse angle with respect to the longitudinal direction of the corresponding permanent magnet 8, on the opposite sides of the portion extending linearly in the same direction as the permanent magnet 8. The magnet insertion holes 11 generally have a convex shape inwardly in the radial direction. Both end sections of the permanent magnet 8 in the longitudinal direction are adjacent to the regions $12a$ extending linearly in the same direction as the longitudinal direction of the permanent magnet 8, respectively.

When the width of the region $12a$ in an extension direction is represented as R2a and the width of the region $12b$ in an extension direction is represented as R2b, the width R2 of the magnet insertion hole 11 is defined by $R2=R1+2\times(R2a+R2b)$. Generally, R2 is the width of the magnet insertion hole 11 along the extension direction of the magnet insertion hole 11 from one of the paired space sections 12 to the other. R2 is also the width of the magnet insertion hole 11 in the longitudinal direction.

According to the present embodiment, as compared to the first embodiment, the length of the space sections 12 can be increased by arranging the permanent magnets 8 on an inner side in a radial direction of the rotor core 7 and bending the space sections 12 outwardly in the radial direction of the rotor core 7 between the magnetic poles, thereby enabling to further improve the demagnetization resistance. Other configurations, operations, and effects of the present embodiment are the same as those of the first embodiment.

The space sections 12 can have shapes other than those illustrated in the first and second embodiments. For example, the region 12a and the region 12b can be smoothly connected to form the space sections 12 in an arc shape. The space section 12 can be bent in such a manner that the magnet insertion hole 11 has a convex shape outwardly in the radial direction.

Third Embodiment

Figure 4:
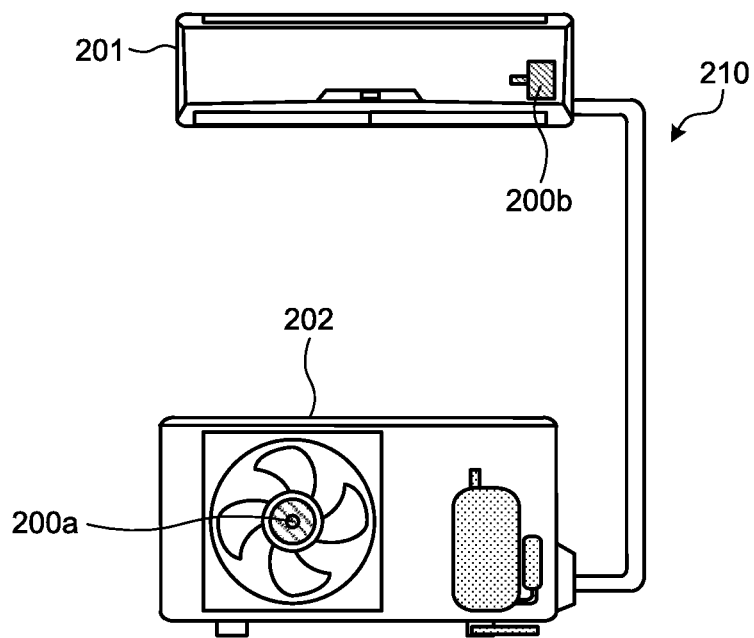
FIG. 4 is a diagram illustrating a configuration of a refrigerating air conditioner according to a third embodiment.

FIG. 4 is a diagram illustrating a configuration of a refrigerating air conditioner according to the present embodiment. A refrigerating air conditioner 210 includes an indoor device 201 and an outdoor device 202 connected to the indoor device 201. The outdoor device 202 includes a blower 200a. The indoor device 201 includes a blower 200b. The blowers 200a and 200b each include the permanent-magnet-embedded electric motor 30 of the first embodiment.

According to the present embodiment, each of the blowers 200a and 200b includes the permanent-magnet-embedded electric motor 30 of the first embodiment and thus causes less noise and is highly efficient. Therefore, the refrigerating air conditioner 210 causes less noise and is highly efficient.

The permanent-magnet-embedded electric motor 30 of the first embodiment can be mounted on electric devices other than the air conditioner. Also in this case, effects identical to those of the present embodiment can be achieved.

The configurations described in the above embodiments provide examples of contents of the present invention. These configurations can be combined with other known techniques or a part of the configurations can be omitted or modified without departing from the scope of the present invention.

REFERENCE SIGNS LIST 1 stator core, 1a yoke, 2 slot, 3 teeth, 3a base section, 3b distal end section, 4 coil, 5 stator, 6 rotation shaft, 7 rotor core, 8 permanent magnet, 9 rotor, 10 clearance, 11 magnet insertion hole, 12 space section, 12a, 12b region, 30 permanent-magnet-embedded electric motor, 200a, 200b blower, 201 indoor device, 202 outdoor device, 210 refrigerating air conditioner.

The invention claimed is:

1. A permanent-magnet-embedded electric motor comprising:
a stator core that includes an annular yoke and a plurality of teeth arranged on an inner side of the yoke at an equal interval in a circumferential direction of the yoke and respectively inwardly projecting from the yoke in a radial direction of the yoke;
an annular rotor core that is arranged on an inner side of the stator core and includes a plurality of magnet insertion holes formed at equal intervals in a circumferential direction of the annular rotor core; and
a plurality of permanent magnets respectively inserted into the plurality of magnet insertion holes, the plurality of permanent magnets being arranged at positions respectively corresponding to sides of an imaginary regular polygon having a same number of corners as number of the magnet insertion holes, each of the permanent magnets with a lateral direction set in a radial direction of the rotor core and with a longitudinal direction set in a direction orthogonal to the radial direction, wherein
each of the plurality of teeth includes a base section inwardly projecting from the yoke in the radial direction of the yoke and having a fixed width in a direction orthogonal to the radial direction of the yoke; and a distal end section provided on an inner side of the base section and having a width larger than the fixed width of the base section in the direction orthogonal to the radial direction of the yoke,
each of the permanent magnets has longitudinal end parts, and each longitudinal end part is adjacent to a space section that forms a part of the magnet insertion hole into which the permanent magnet is inserted,
when a width of the base section is represented as S1, a width of the distal end section is represented as S2, a width of the permanent magnet in the longitudinal direction is represented as R1, and a width of the magnet insertion hole along a direction in which the magnet insertion hole extends is represented as R2, relations S1 R1≤S2 and S1≤R2−R1 are satisfied, and
the space sections extend linearly from the longitudinal end parts of the permanent magnets, respectively, and the entirety of each of the space sections is arranged on a straight line with a corresponding one of the permanent magnets, and (R2−R1) is a sum of the widths of a pair of space sections associated with the corresponding one of the permanent magnets, wherein each of the space sections includes a region having a radial width substantially the same as a radial width of the corresponding one of the permanent magnets in a direction perpendicular to the longitudinal direction of the corresponding one of the permanent magnets.

2. The permanent-magnet-embedded electric motor according to claim 1, wherein a relation S2≤R2 is satisfied.

3. The permanent-magnet-embedded electric motor according to claim 1, wherein each of the plurality of permanent magnets is a rare-earth magnet.

4. The permanent-magnet-embedded electric motor according to claim 1, wherein the number of the permanent magnets is ten, and the number of slots formed by adjacent ones of the teeth in a circumferential direction of the yoke is twelve.

5. The permanent-magnet-embedded electric motor according to claim 1, comprising a coil wound around the teeth, wherein wire connection of wires of the coil is delta connection.

6. A blower comprising the permanent-magnet-embedded electric motor according to claim 1.

7. A refrigerating air conditioner comprising the blower according to claim 6.

* * * * *